Patented July 17, 1923.

1,461,745

UNITED STATES PATENT OFFICE.

FREDERICK WILLIAM ATACK, OF CHARLESTON, WEST VIRGINIA.

PROCESS OF PURIFYING ANTHRAQUINONE AND ITS DERIVATIVES.

Application filed July 19, 1922. Serial No. 576,126.

*To all whom it may concern:*

Be it known that I, FREDERICK WILLIAM ATACK, a subject of the King of Great Britain, temporarily residing at Charleston, county of Kanawha, State of West Virginia, have invented certain new and useful Improvements in Processes of Purifying Anthraquinone and Its Derivatives; and I do hereby declare the following to be a full, clear, and exact description of the invention, such as will enable others skilled in the art to which it appertains to make and use the same.

This invention relates to processes of purifying anthraquinone and its derivatives; and it comprises more particularly a process in which the crude anthraquinone or derivative thereof is heated in a phenol-water mixture of such character and under such conditions that said phenol-water mixture remains a substantially homogeneous liquid upon cooling to ordinary room temperature, thus permitting easy separation of purified anthraquinone or a derivative thereof under particularly convenient conditions of technical operation.

The technical purification of anthraquinone necessitates a procedure that is effective to remove any inorganic (mineral) matter introduced during the manufacture and also organic impurities. A general method of accomplishing this is by dissolving crude anthraquinone in a suitable solvent, ordinarily organic, heating, filtering out mineral impurities, and then allowing the solution to cool, whereupon pure anthraquinone crystallizes out. The comparatively low solubility of anthraquinone in most solvents has led to the proposed use of special solvents such as, for example, nitrobenzene, aniline, monochlorbenzene, or cresol.

It has also been suggested heretofore that phenol could be used as a solvent for anthraquinone, and it is in fact a much better solvent than, for example, nitrobenzene or monochlorbenzene. However, an objection to its use for the technical purification of anthraquinone has been the fact that the phenol solidified under the conditions most favorable for the technical separation of purified anthraquinone, for example, at temperatures ranging, say, from 10° to 25° C. I have now found that this objection can be avoided by employing a phenol-water mixture, such as phenol monohydrate, as the solvent medium or menstruum under heating conditions so controlled that, upon cooling to ordinary temperatures, say at 10° to 25° C., the phenol-water mixture remains a homogeneous liquid and hence allows a much more complete and easier separation of the purified anthraquinone or its derivative than if pure phenol were used. It is possible to introduce wet crude anthraquinone into phenol or phenol monohydrate, drive off water to the required point by heating, centrifuge hot to free from mineral matter, and then allow to cool; whereupon a product of a high degree of purity crystallizes out and can be easily separated by filtration from the homogeneous liquid menstrum or mother liquor. If the cool mixture containing the crystallized product is centrifuged and washed on the centrifuge, the product may be dried sufficiently for technical purposes by application of a current of hot air.

Other advantages of using phenol-water mixtures are that not only may moist crude anthraquinone or a derivative thereof be used, but in addition it is not necessary to raise the solvent to the boiling point, as is necessary in the case of nitrobenzene for example, in order to remove the excess water, which high temperature involves much larger loss of solvent. Also it is much more convenient in handling, with less danger to labor, to work at the lower temperatures which may be used with phenol-water mixtures as compared with pure phenol.

The crude anthraquinone either dry or paste, may be either "synthetic" (i. e. made from phthalic anhydrid), or made from anthracene.

Example: 30 parts of crude synthetic anthraquinone (30 per cent paste) are added to 100 parts of phenol monohydrate, the mixture heated to drive off water until the liquid is at 105° C., whereupon the mixture is centrifuged to free it from mineral matter, the liquid is allowed to cool, and the crystallized anthraquinone filtered off. The mother liquor approximating to phenol monohydrate, may be used several times before it needs to be re-distilled.

It is to be understood that the foregoing example, although illustrating a particularly desirable way in which the invention can be carried out in practice, is merely typical of procedures within the broad scope of the invention as defined by the appended claims.

What I claim is:

1. The process of purifying anthraquinone or a derivative thereof which comprises heating crude anthraquinone material in a solvent bath comprising a phenol-water mixture and crystallizing a purer anthraquinone product therefrom.

2. The process of purifying anthraquinone or a derivative thereof which comprises heating crude anthraquinone material with a phenol-water mixture and distilling off water until the solvent is substantially phenol monohydrate; and then crystallizing a purer anthraquinone product from the mother liquor.

3. The process of purifying anthraquinone or a derivative thereof which comprises heating the crude anthraquinone material with a phenol-water mixture, distilling off water to a point where the phenol-water mixture would remain a homogeneous liquid if cooled to ordinary temperature, separating solid foreign matter from the mixture while still hot, allowing the mixture to cool, and then separating a purified anthraquinone product from the mother liquor.

4. The process set forth in claim 3, further characterized by re-use of the mother liquor to dissolve more crude anthraquinone material in the purification thereof.

5. The process of purifying crude dry anthraquinone which comprises re-crystallizing the same from a phenol-water mixture approximating phenol-monohydrate in composition and remaining a homogeneous liquid at ordinary temperature.

In testimony whereof I hereunto affix my signature.

FREDERICK WILLIAM ATACK.